No. 764,282. PATENTED JULY 5, 1904.
W. O. DUNTLEY.
BATTERY CELL.
APPLICATION FILED FEB. 15, 1904.
NO MODEL. 2 SHEETS—SHEET 1.
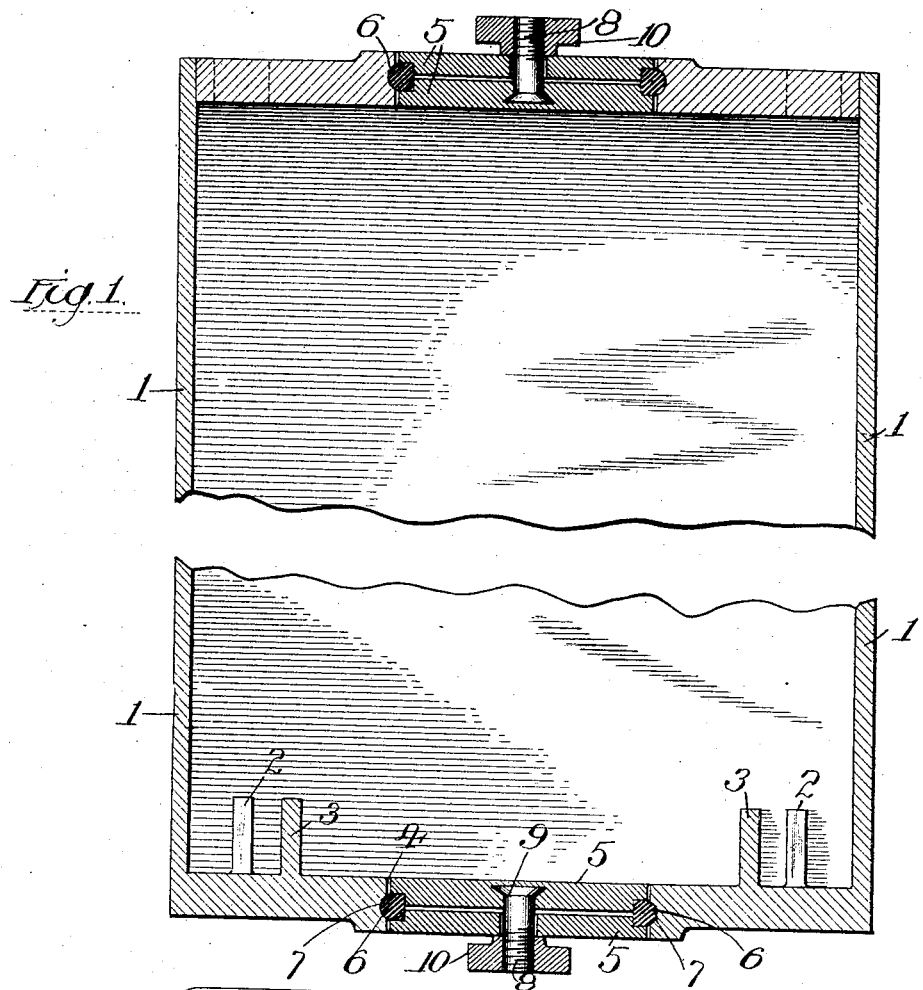
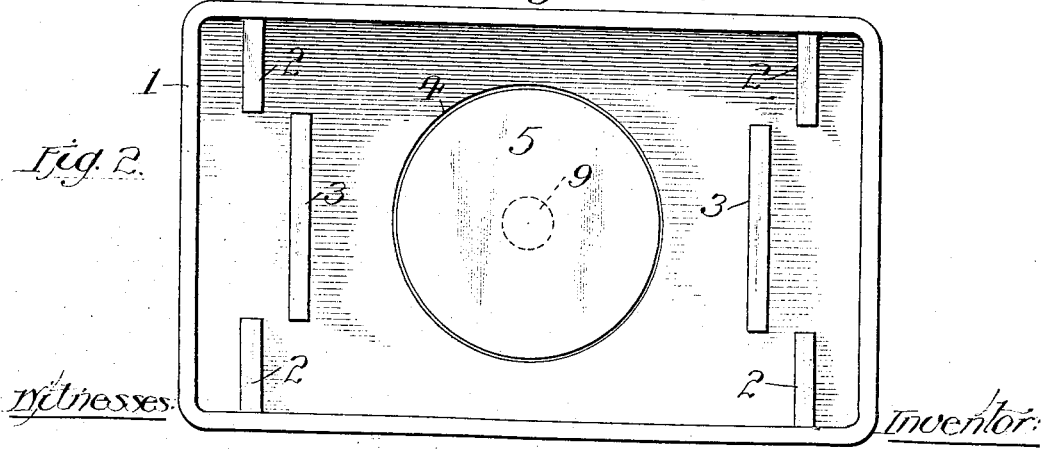
Witnesses Inventor
William O. Duntley
By Rector & Hibben
His Attorneys No. 764,282. PATENTED JULY 5, 1904.
W. O. DUNTLEY.
BATTERY CELL.
APPLICATION FILED FEB. 15, 1904.
NO MODEL. 2 SHEETS—SHEET 2.
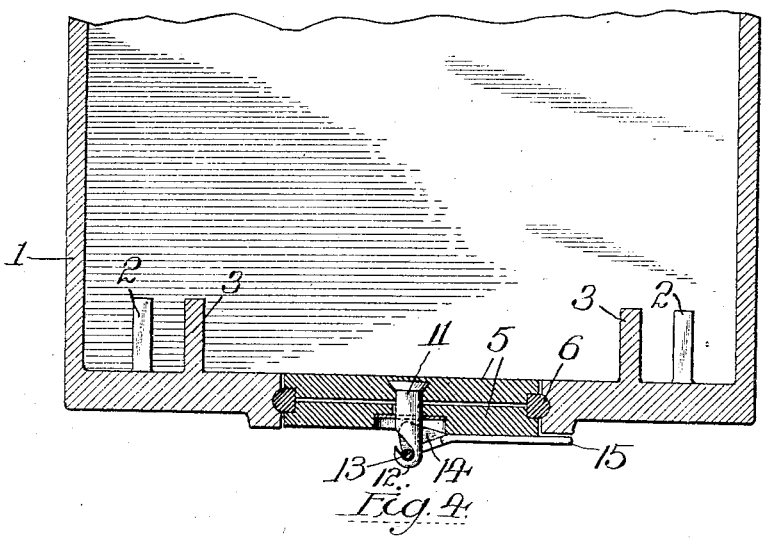
Fig. 3
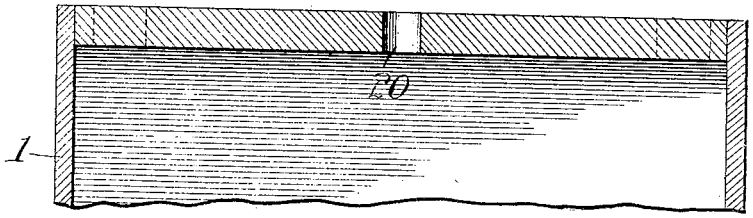
Fig. 4
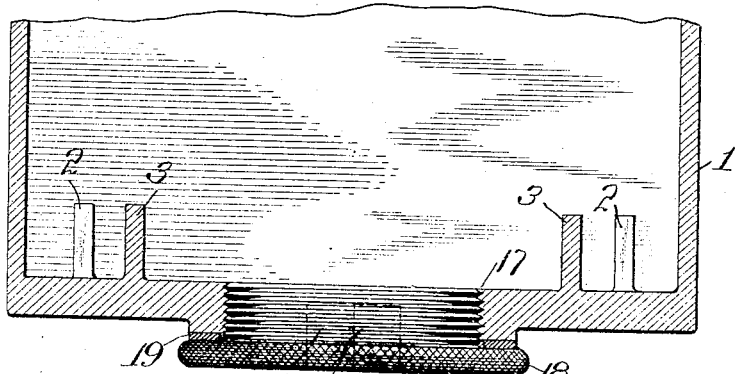
Fig. 5
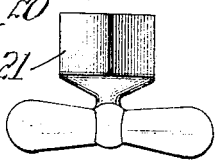
Witnesses:
Lute S. Alter
Edward R. Barrett
Inventor:
William O. Duntley
By Rector & Hibben
His Attorneys No. 764,282.

Patented July 5, 1904.

UNITED STATES PATENT OFFICE.

WILLIAM O. DUNTLEY, OF CHICAGO, ILLINOIS.

BATTERY-CELL.

SPECIFICATION forming part of Letters Patent No. 764,282, dated July 5, 1904.

Application filed February 15, 1904. Serial No. 193,611. (No model.)

*To all whom it may concern:*

Be it known that I, WILLIAM O. DUNTLEY, residing at Chicago, Cook county, Illinois, have invented certain new and useful Improvements in Battery-Cells, of which the following is a specification.

My invention pertains to the cells of storage batteries; and the object thereof is to produce novel and efficient cells of this character so constructed and arranged that they may be readily and effectually cleansed and recharged with solution, the operation being rendered so simple and convenient that any unskilled person may do the work.

As is well known, the sediment from the active material of the battery-grids and that resulting from chemical action settles upon the bottom of battery-cells, eventually causing short-circuiting when sufficient thereof has accumulated, resulting in the deterioration of the cells and their final destruction unless such accumulated material or sediment is removed and the cells recharged with the proper solution. Heretofore in removing and washing out such sediment considerable difficulty has been experienced, and the work has been of such a nature as to require the services of persons skilled in the practical art of storage batteries. One of the principal difficulties has arisen from the fact that the battery-cells when connected together in the usual manner, as by bus-bars or the burned connections, are practically inaccessible, with the result that experts are required, it even being necessary sometimes to disconnect the cells of a series at the expenditure of considerable time and labor. When such cells are used for electric automobiles, the machine is necessarily kept out of service during this operation or else an extra or substitute set of battery-cells must be in readiness.

The object of my present invention is to overcome the difficulties above named and to produce a battery-cell which can be cleaned and washed out and renewed by a mere novice. To this end I provide the battery-cells with a bottom opening closed by a readily-removable closure, and in case the battery-cells are of that type whose tops are sealed I provide such tops with a similar opening normally closed by a suitable closure. In addition I arrange a series of battery-grid supports on the bottom of the cells, so positioned or staggered as to prevent the sediment from lodging in any pockets.

In the accompanying drawings, Figure 1 is a central longitudinal section of the preferred form of battery-cell embodying my improvements; Fig. 2, a plan view of my improved cell with the top removed; Fig. 3, a section of the lower end of a cell, showing a modified form of construction so far as the means for sealing the closure is concerned; Fig. 4, a section of the lower end of a cell, showing a modified form of closure, and Fig. 5 an elevation of a key-wrench employed for closure 16.

The battery-cell proper (marked 1) is of the usual and well-known construction and of suitable shape and dimensions, and the same is adapted to receive the usual battery-grids (not shown) and the proper solution. To support the battery-grids, I provide a series of upturned ribs or flanges arranged in dodged or staggered relation on the bottom of the cell and at the sides thereof, the supports 2 thereof extending inwardly from the sides of the cell and the supports 3, which are nearer the middle portion of the cell, rising from the bottom of such cell. These supports are so arranged as to prevent the formation of pockets to receive and hold any material or dirt, with the result that the entire surface of the bottom of the cell can be thoroughly cleansed and washed.

The battery-cell has a central opening 4, preferably circular, and adapted to be closed by a closure which, as shown in Fig. 1, comprises two parallel disks 5, whose adjacent marginal edges are undercut, so as to provide (when the two disks are in position) a peripheral groove to receive a ring or gasket 6, of rubber or other suitable material. This gasket is arranged to be received by and to fit into a circular groove 7 in the opening 4 of the cell. The two disks 5 are kept slightly separated by the gasket 6, which under normal conditions—that is, when not in use—is of such size and shape as to be substantially contained within the groove formed by the disks, as described, so that the disks, together with their gasket, can be readily inserted and removed from the cell-openings. For the purpose of bringing the disks toward each other, and thereby bulging or expanding the gasket outwardly and into the circular groove 7 when such closure is in position, suitable means are provided, the preferred form of which is shown in Fig. 1. As there shown, a screw-bolt 8 is secured to the innermost disk 5 by having its head 9 molded into the body of such disk, which, as well as the other disk, is by preference made of vulcanized rubber or material equivalent for the purpose. The bolt 8 passes loosely through the outermost disk and upon its ends screws the knurled nut 10, arranged to screw up and bear against the outermost disk, and thereby bring the disks closer together and to expand the rubber in the groove 7. By this means an easily-manipulated and an effectually-sealed closure is provided.

In practice the tray, with its batteries, is placed on a suitable support and the bottom closure or plug is removed, thereby permitting the electrolyte to escape. If it is desired to preserve this electrolyte and use it again after being filtered, the same is received into a waiting receptacle as it flows from each of the batteries as the plugs are removed. Water or other cleansing fluid is now passed or forced into and through the cells in suitable manner, as by means of a hose, without removing the battery elements, whereupon the cells and such battery elements are thoroughly washed and cleansed without disturbing or injuring the delicate grids. After the closure or plug is replaced the cells are renewed with the electrolyte and after the top is closed the cells are again ready for service. In case the cell is of the sealed-top type a top opening and closure similar to the bottom ones are provided, as shown in Fig. 1, in which event after removal of the two closures the hose may be inserted in the top opening and the washing done directly through the cell.

In Fig. 3 I have illustrated a modified form of the means for bringing or forcing said disks toward each other, in which modified form a pin 11 is embodied or vulcanized in the innermost disk and passed through the outermost disk. Its outer end is provided with a hook 12 to receive the bearing 13 of a cam 14, having a handle 15. This cam bears against the outermost disk and serves to cause the two disks to move toward and away from each other.

In Fig. 4 is shown a modification as to the entire closure and embodying the broad idea or feature of my invention. In this form the closure is a screw-cap 16, adapted to screw into the screw-threaded opening 17 of the battery-cell, and having a flanged head 18 arranged to bear against a circular gasket 19 for sealing purposes. The particular cell illustrated in Fig. 4 is of the removable-top type, having the usual small opening 20, and consequently such cell need not have an opening and closure similar to that of the bottom. To assist or facilitate the unscrewing of the closure or screw-cap 16, the same may have a central angular opening 20, as shown in dotted lines in Fig. 4, to receive a key-wrench 21. (Illustrated in Fig. 5.)

The particular construction of my cells makes the interior thereof readily accessible, and thereby renders the work of washing or cleansing a very simple matter, which can be attended to by a mere novice as well as by the most skilled battery expert or mechanic. Inasmuch as the washing of the battery-cells is put within the power of the users thereof, who generally are not experts in that art, such cells will be more frequently cleansed and better taken care of, with the result that the efficiency of the cells is kept closer to maximum and the life thereof materially prolonged. As hereinbefore mentioned, means were not heretofore provided for passing water or other cleansing fluid through the cell to wash or cleanse it, and it is this feature, in connection with a battery-cell of the proper construction, which constitutes the essence of my invention and which removes one of the principal objections or obstacles to the more extended or universal acceptance of batteries as a source of power. Whether the cell is of the sealed-top type or not, the cell is considered as provided with means permitting the passing of water or other cleansing fluid through the cell to wash it out through the bottom opening.

It will be understood from the foregoing description that my battery or cell belongs to that type or class which may be designated as the "wet battery or cell" as distinguished from the so-called "dry battery or cell."

I claim—

1. A battery-cell having a bottom opening, a closure therefor independent of the battery elements, and means for passing a cleansing fluid through the cell to wash it out through said opening; substantially as described.

2. A battery-cell having a bottom opening substantially central of the bottom, a removable closure therefor independent of the battery elements, and means for passing a cleansing fluid through the cell to wash it out through said opening; substantially as described.

3. A battery-cell having bottom and top openings and closures therefor independent of the battery elements, whereby a cleansing fluid may be passed through the cell to wash it out through the bottom opening; substantially as described.

4. A battery-cell having a bottom opening, a closure therefor, means for passing a cleansing fluid through the cell to wash it out through said opening, and battery-element supports arranged on the bottom of the cell in staggered relation to prevent formation of pockets and enable sediment to be washed out; substantially as described.

5. A battery-cell having a bottom opening substantially central of the bottom, a closure therefor, means for passing a cleansing fluid through the cell to wash it out through said opening, and battery-element supports arranged on the bottom of the cell on either side of such opening and in staggered relation to prevent formation of pockets; substantially as described.

6. A battery-cell having a bottom opening, a closure therefor independent of the battery elements and having an expandible gasket to engage and seal such opening, and means permitting the passing of a cleansing fluid through the cell and its opening; substantially as described.

7. A battery-cell having a bottom opening, and a closure therefor independent of the battery elements and comprising a pair of disks, a gasket carried by the margins of such disks, means for expanding such gasket outwardly to engage such opening, and means permitting the passing of a cleansing fluid through the cell and its opening; substantially as described.

8. A battery-cell having a bottom opening, and a closure therefor independent of the battery elements and comprising a pair of disks, a gasket carried by the margins of such disks, means for bringing such disks toward each other and thereby expanding the gasket to engage said opening, and means permitting the passing of a cleansing fluid through the cell and its opening; substantially as described.

9. A battery-cell having an opening provided with a circular groove and a closure therefor independent of the battery elements and comprising a pair of disks carrying a gasket expandible into said groove and means permitting the passing of a cleansing fluid through the cell and its opening; substantially as described.

10. A battery-cell having an opening provided with a circular groove and a closure therefor independent of the battery elements and comprising a pair of disks carrying a gasket expandible into said groove, and means for moving the disks toward each other to expand the gasket and means permitting the passing of a cleansing fluid through the cell and its opening; substantially as described.

11. A battery-cell having an opening provided with a circular groove and a closure therefor independent of the battery elements and comprising a pair of disks carrying a gasket expandible into said groove, the adjacent edges or corners of the disks being undercut to form a peripheral channel to receive such gasket, and means permitting the passing of a cleansing fluid through the cell; substantially as described.

12. A battery-cell having an opening provided with a circular groove and a closure therefor independent of the battery elements and comprising a pair of disks carrying a gasket expandible into said groove, a screw-bolt and nut for moving the disks toward each other to expand the gasket, and means permitting the passing of a cleansing fluid through the cell; substantially as described.

13. A battery-cell having an opening provided with a circular groove and a closure therefor independent of the battery elements comprising a pair of disks carrying a gasket expandible into said groove, a screw-bolt having its head embedded in the innermost disk and passing loosely through the outermost disk, and a nut screwing in such bolt and bearing against said outermost disk, said cell having means permitting the passing of a cleansing fluid through the cell and opening; substantially as described.

14. A battery-cell having a series of battery-element supports arranged on its bottom in staggered relation; substantially as described.

15. A battery-cell having a series of battery-element supports 2 and 3 arranged on its bottom, the supports 2 being disposed at the sides of the cell and the supports 3 near the middle line thereof in staggered relation with respect to the supports 2; substantially as described.

16. A battery-cell having a bottom opening, a closure therefor, and battery-element supports arranged on the bottom of the cell and comprising a plurality of ribs rising from the bottom of the cell and of less width than the cell to prevent formation of pockets and enabling sediment to be washed out through the bottom opening; substantially as described.

WILLIAM O. DUNTLEY.

Witnesses:
GEO. H. HAYES,
LOUIS B. ERWIN.